United States Patent [19]
Richard

[11] Patent Number: 5,347,863
[45] Date of Patent: Sep. 20, 1994

[54] ASPHALT OIL TANK MONITOR

[76] Inventor: Clarence N. Richard, 3624 Sussex Pl., Minnetonka, Minn. 55345

[21] Appl. No.: 85,079

[22] Filed: Jul. 2, 1993

[51] Int. Cl.⁵ .................. G01F 23/18; G01F 23/14
[52] U.S. Cl. ........................................ 73/301; 73/302
[58] Field of Search ............................. 73/301, 302

[56] References Cited

U.S. PATENT DOCUMENTS

| | | | |
|---|---|---|---|
| 1,822,458 | 9/1931 | Rowland et al. | 73/302 |
| 2,153,450 | 4/1939 | Borden | 73/302 |
| 3,475,959 | 11/1969 | Glassey | 73/302 |
| 3,587,316 | 6/1971 | Kapteyn | 73/302 |
| 4,649,739 | 3/1987 | Horner | 73/302 |
| 4,665,746 | 5/1987 | Sheppard | 73/302 |
| 4,669,309 | 6/1987 | Cornelius | 73/302 |
| 4,840,056 | 6/1989 | Fernandez et al. | 73/302 |
| 5,052,222 | 10/1991 | Stoepfel | 73/302 |
| 5,059,954 | 10/1991 | Beldham et al. | 73/302 |
| 5,115,679 | 5/1992 | Uhlarik | 73/302 |

FOREIGN PATENT DOCUMENTS

| | | | |
|---|---|---|---|
| 0821123 | 11/1951 | Fed. Rep. of Germany | 73/302 |
| 2249036 | 4/1974 | Fed. Rep. of Germany | 73/302 |
| 0692073 | 10/1930 | France | 73/302 |
| 0210724 | 10/1985 | Japan | 73/302 |
| 0607112 | 5/1978 | U.S.S.R. | 73/302 |
| 0338529 | 5/1929 | United Kingdom | 73/302 |

*Primary Examiner*—Diego F. F. Gutierrez
*Attorney, Agent, or Firm*—Frederick A. Fleming

[57] ABSTRACT

A pipe probe is installed downward into the liquid contained in the tank and is connected pneumatically to a remote reporting unit located in the operator's area. An air pump pressurizes the probe, increasing the pressure up to the point at which the liquid is completely displaced from the probe and bubbles of air evolve from the end of the probe. At that point the pressure is proportional to the height of the liquid in the tank. A pneumatic connection from the probe to the reporting unit refers the pressure to a piezoresistive pressure transducer working in concert with an electronic process controller. The controller produces a voltage output which is reported as a digital numeric readout, reading in volts or in programmed engineering units. Jittery variations in the least significant figure of the numeric readout, which are associated with the evolution of air bubbles from the end of the probe, are eliminated by adding an air tank buffer to the pneumatic system.

3 Claims, 2 Drawing Sheets

ASPHALT OIL TANK MONITOR

BACKGROUND OF THE INVENTION

1. Field of the Invention

The invention is in the field of monitoring the quantity of oil or liquid contained in a tank, and especially the troublesome area of measurement of the quantity of hot liquified asphalt—"asphalt oil"—as contained in and dispensed from tanks commonly of 100-ton capacity by asphalt contractors.

2. Prior Art

Asphalt paving is made up of a mixture of sand, crushed rock and asphalt. At ordinary temperatures asphalt is unmanageable because of its viscous, semi-solid, plastic character. Asphalt is therefore liquified by heating it to about 325° F. for shipment in tank trucks and is maintained at that temperature in storage up until the time that it is formulated into the paving material. The liquified asphalt is popularly known as "asphalt oil," although that term may have another meaning in another context.

For many years, the practice among asphalt plant operators has been to estimate the quantity of asphalt oil in a tank by sending a workman to top of the tank with a flashlight and a "tankstick" or a tape measure, to throw open a heavy manhole cover and to peer into the dark, steamy, smelly tank while probing to determine the distance at which the end of the stick touches the oil, and to report that measurement to compute the quantity by reference to a chart.

Mechanical float devices which actuate a dial gauge have been noted in some older asphalt plants, but have fallen into disuse. One such gauge to be found at the Scott Contracting Company's plant in the Wisconsin Dells has three readings, FULL, HALF, and TURN OFF HEATER, which provide sparse information: the gauge has been stuck and useless for many years.

The use of a set of load cells under the supporting members of the tank has been considered but has been found to be cost prohibitive.

As a control systems troubleshooter and a supplier of controls to the asphalt plant industry, I was asked many times, particularly during the last two years, for better means to measure the quantity of oil. I sought long and diligently to locate a tank gauge to supply to my clients, but there were none to be found.

The Problem

An asphalt plant is a hazardous, highly mechanized and motorized environment involving materials handling on a grand scale. At the formulation area is found the operators' office and within it steel cabinets containing electrical controls to operate the conveying and mixing equipment. Huge tanks of up to 200-ton capacity store asphalt oil held at 325° F. Huge rotating drum dryers work to heat and to drive off water from the sand and aggregate components. Metering pumps and conveyers work to carry the materials to rotating drum mixers or pug mills that blend the ingredients under the direction of the operator and a computer in the office, where the operator is confronted with a bank of dials, meters and controls. At the command of the operator, conveyers carry the hot asphalt mix high overhead to hoppers situated to dump the asphalt into trucks positioned below. Asphalt oil for the mixing operation is maintained in tanks near the site of the mixer. The tanks, typically are of about 100-ton capacity, being cylinders 12 feet in diameter and 30 feet in length. The focus of my invention is measurement of the quantity of asphalt oil in such a tank.

Tanksticking

The conventional way to measure the asphalt oil in the tank is to send a workman to the top of the tank with a "tankstick," which is a calibrated rod or a measuring tape. The workman must leave the security of the office, walk the distance from the office to the tank, climb up a 16 foot ladder, gain access to a manhole cover at the top surface of the tank, open a heavy manhole cover, insert a stick or a tape measure into the port, and observe when the end of the device reaches the top surface of the asphalt oil. This task is hazardous and disagreeable. The workman must virtually stick his head adjacent to the mouth of the tank to see anything within the tank because it is pitch-black inside. The workman may use a flashlight to assist him. The asphalt in the tank is held at 325° F. by means of heating coils contained within the bottom of the tank which carry heat exchange liquid from a heater working outside the tank. The bituminous vapors arising from the opening of the manhole are noxious and are regarded as carcinogenic by industry critics. The vapors are flammable and will ignite upon exposure to a flame. There was a notorious accident in which a workman's flashlight failed while he was making a tankstick measurement and he set about to use his cigarette lighter to provide light. An explosion and fire resulted which seriously injured the workman and destroyed property.

When the workman has succeeded in making the measurement of the height of the empty space above the oil, the number is carried back to the office where it is used to figure the volume of oil in the tank by making reference to a chart.

The task of mounting the asphalt tank and making the tankstick measurement is an onerous and dangerous chore. It is important nonetheless that the plant operator be regularly apprised of the tank contents: (i) The asphalt tank must be regularly replenished from an on-site or tank-truck supply. The transfer is carried out by an operator who monitors the delivery using a metering pump and it is critical to have knowledge of how much oil can be delivered to the tank without overfill. An overfill results in the issue of hot asphalt oil from the top of the tank, the hot oil flowing out and washing over the same valve that must be used to shut off flow. The job of the workman who must turn off the valve is treacherous and can result in serious burns. (ii) If the tank contents is unknowingly depleted during the dispensing of oil from the tank during mixing operations, a batch of asphalt can be spoiled. (iii) If the contents of the tank is allowed to fall below a minimum level, there is danger that the oil will become overheated and catch fire unless steps are taken to moderate the flow of heat exchange fluid supplied by an external heater via coils within the bottom of the tank.

The situation that I report here has existed throughout my entire twenty-five year experience with asphalt plants. The idea that the problem could be avoided never occurred to anyone. The need for improved means for monitoring the contents of the asphalt oil tank has been unrecognized even though the need is glaringly implicit and long felt, but unmet over the long history of asphalt plant operations.

My invention addresses this long-felt need and solves the problem. My system continuously monitors the contents of the asphalt oil tank from inside the office and can be programmed to trigger an alarm if the asphalt oil exceeds a maximum fill level during fill operations or falls below the minimum level during dispensing operations. The continuous monitoring of the liquid level provides a cross check of the amount of asphalt oil delivered to any batch of asphalt mix. There is no need for the operator to exit the office, march to the base of the asphalt oil tank, climb the ladder, perch on top of the tank, remove the manhole cover, peer into the tank while endeavoring to see when the stick reaches the oil level, close the manhole cover, descend the ladder, march back to the office and figure the liquid level from the tankstick reading. My system simply reports the quantity on the face of an instrument mounted inside the office and in plain view of the operator. The peril to the tankstick operator can be ended. The operator's knowledge of the contents of the asphalt oil tank is continuous. Guesswork is ended.

SUMMARY OF THE INVENTION

My tank gauge includes a pipe probe which inserts into the tank and an instrument package that is located remote from the tank but is connected pneumatically to the probe by two tubes, an "air tube" and a "pressure tube." Within the instrument package is an air pump to deliver air via the air tube to a manifold at the head of the probe. The pressure tube connects the manifold to a pressure transducer within the instrument package. The pressure transducer employs an element whose resistance changes with pressure and which operates in concert with an electronic process controller to produce an voltage that is proportional to the pressure. The controller is an electronic instrument having a four figure numeric digital readout and it may be programmed to report the voltage in working units such as tons. By working units, I mean engineering units such as pounds, tons, gallons, cubic feet, etc., in contrast to arbitrary electric units such as volts.

In operation, air driven by the air pump via the air tube displaces the liquid asphalt oil from the probe and exhausts as bubbles from the bottom of the probe. The pressure in the probe is referred via the pressure tube to the instrument package where it is displayed in as numeric digital readout in four figures.

The performance of my monitor is improved by appending an air tank to the pressure tube, to increase the volume of the system and therefore buffer jittery insignificant oscillations in pressure which accompany the escape of air bubbles from the bottom of the pipe and which otherwise show up as rapid variations in the least significant figure of the digital readout.

My tank gauge may be programmed to signal an alarm if the liquid level exceeds or falls below specified limits.

The object of my invention is to provide asphalt plant operators with reliable means to monitor the contents of their asphalt oil tanks.

A further object of my invention is to provide the asphalt plant operator with means to measure the delivery of a specific weight of asphalt oil as required for a specific batch of asphalt, and/or to afford a cross check on the dispensing of asphalt oil in a continuous-mix asphalt operation.

A further object of my invention is to save the labor costs that are entailed by the arduous tanksticking method.

A further object is to provide an accurate remote measure of the liquid contents of a tank in which the numeric readout is free of annoying jittery variation in the least significant figure of the readout.

After conceiving of a solution to the problem by the use of a novel combination of old control elements, and after implementing an experimental model of my monitor, certain problems appeared which are unique to the invention. I solved the following problems.

An experimental model (in which a single pneumatic tube served both to carry the output of the air pump to a ¼ inch pipe probe and to conduct a pressure signal to the pressure tranducer) produced a nonlinear response. I reasoned that the pressure signal was being perturbed by the air flow in the tube according to the working of Bernoulli's principal, which simply stated is, "Where the speed is great, the pressure is small." I divorced the air supply from the pressure signal by employing two pneumatic tubes instead of one, and I minimized the speed of airflow in the probe by increasing its diameter from ¼ inch to 1 inch, which increased the probe cross section by 16 fold, and reduced the air speed by a factor of 16 at the sampling point at the head of the probe. The result was a perfectly linear response.

A second problem was a jittery behavior of the digital readout. I reasoned that the pressure tube system was of such small volume, and the pressure signal so faithfully conducted, that tiny pressure changes produced by the evolution of air from the end of the probe were responsible for the jittery pressure reading. My solution to this problem was to append an auxiliary small air tank to the pressure tube, to buffer the small pressure variations around the time-average value.

DESCRIPTION OF THE PREFERRED EMBODIMENT

The asphalt oil tank I (FIG. 1) to be monitored is typically a cylindrical tank 12 feet in diameter and 30 feet in length, supported parallel to the ground on a platform or truck bed four feet off the ground.

Figure 1:
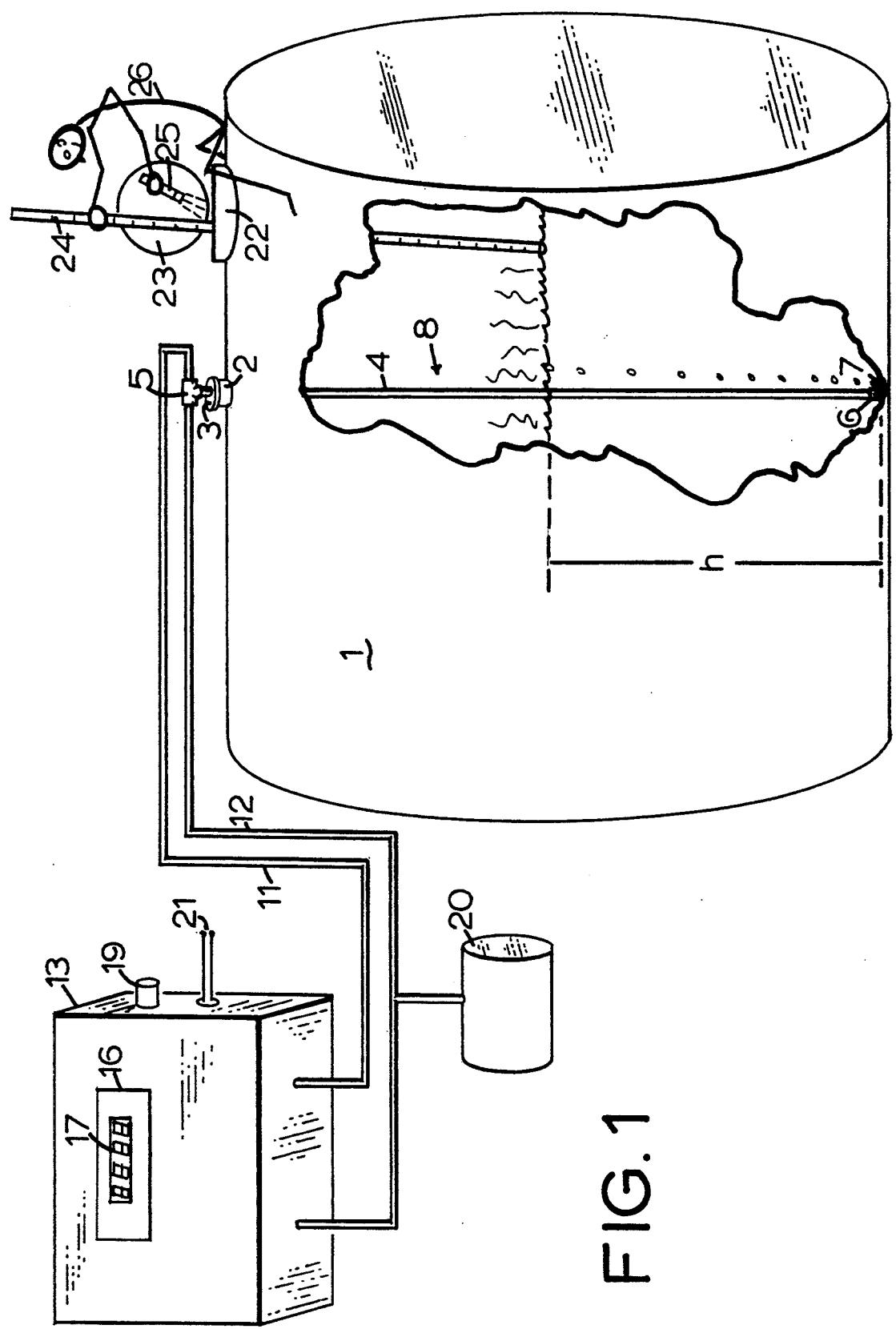
FIG. 1 is a partly-pictorial, partly-schematic drawing of the environment of my invention together with a simplified block diagram illustrating the features of the instrument package. Also shown is a stick figure representing a workman carrying out a tanksticking measurement at an open manhole on top of the tank. Parts of the drawing representing the asphalt tank are broken away to show the placement of the probe and the tankstick.
Figures 2, 3:
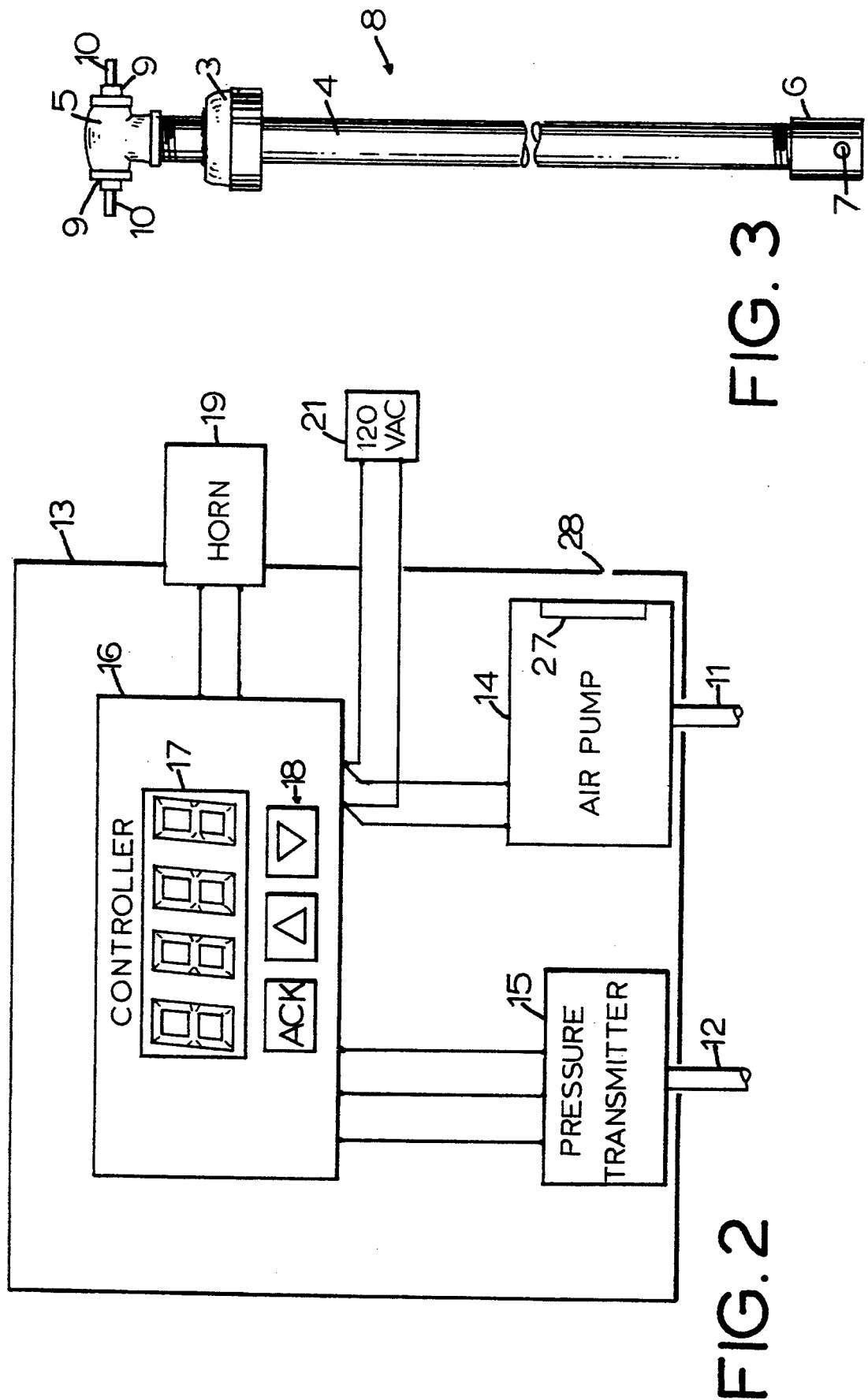
FIG. 2 is a schematic representation of the components which I have assembled within an instrument package to implement my tank gauge, the components represented largely in block diagram form, with appropriate indication of the relationship between the parts.
FIG. 3 is a plan view of my assembled probe which is mounted in the asphalt tank to pneumatically probe the contents of the tank.

To install my monitor, the tank is examined to find a suitable sample port 2 on the top of the tank. The sample port will be a 3 to 4 inch diameter pipe nipple, typically 3 to 5 inches long, welded at the mouth of an aperture in the tank and covered with a pipe cap 3. The pipe cap is removed and it, or one like it, is taken to a workshop where the probe 8 (FIG. 3) is assembled. An aperture is drilled into the axial center of the cap to snugly receive the outside diameter of a 1" pipe 4 whose length exceeds the diameter of the tank 1 by 8 to 12 inches which will extend above the tank when the probe is installed in the tank. The pipe 4 is inserted into the modified pipe cap and welded to it at a position to provide that the probe 8 will reach near the bottom of the tank when installed into the sample port. The top end of the pipe is fitted with a pipe tee to serve as a manifold 5. The bottom end of the pipe is threaded into a short pipe sleeve 6 having lateral orifices 7 drilled within one inch of the end of the sleeve. Thus assembled, the probe 8 is installed in the tank by threading the pipe cap upon the pipe nipple at the sample port. The manifold 5 is adapted by means of reducing bushings 9 and tubing fittings 10 to provide attachment of two individual ¼ inch nylon pneumatic tubes 11, 12 (FIGS. 1, 2).

The two tubes are bundled together and routed to an instrument package 13 which may be mounted on or about the asphalt oil tank or which may be located in a office located remote from the tank by as much as 250 feet.

One of the tubes—the air tube 11—is pneumatically connected to an air pump 14 (FIG. 2) within the instrument package 13.

The other tube—the pressure tube 12—is pneumatically connected to a pressure transducer 15 within the instrument package 13.

The air pump 14 is a diaphragm pump having a maximum output of 4 liters per minute and will develop a maximum pressure (closed system) of 7 to 8 pounds per square inch (gauge). The manufacturer is Binaca Products Company of Bordentown, N.J. In operation, the air pump works to displace the column of asphalt oil in the probe 8, the air exhausting from the bottom end of the pipe via the orifices 7 in the pipe sleeve 6. The air intake of the pump is protected with a filter 27, and a vent 28 is provided in the instrument package (13) to admit intake air.

The pressure developed in the probe 8 is directly proportional to the height h (FIG. 1) of the column of asphalt oil displaced and that pressure is directly referred to the pressure transducer 15 via the column of air in the pressure tube 12.

The pressure transducer 15 includes a solid state silicone piezoresistive sensing element, electrostatically bonded to a glass pedestal to virtually eliminate the effects of induced stress and vibration, and features a laser-trimmed, custom, hybrid circuit which standardizes output and provides precise temperature and pressure compensation. It is made by Amatek PMT Division of Feasterville, Pa. Model IPT, 4–20 milliampere output.

The output signal of the pressure transducer 15 is input to a controller, the Model 327 Process Monitor of Powers Process Controls, of Skokie, Ill. This unit is contained in a small box-like case containing electronic components including logic circuitry. The unit has twenty terminals for connection to selected input and output devices. In my application, only selected terminals are employed, as illustrated schematically in FIG. 2. A 120-volt alternating current line 21 supplies power directly to the controller and is routed from the controller to the other components. In the drawing (FIG. 2), only the face of the unit is illustrated, showing the digital readout panel 17 and three push-pad keys be which may be actuated according to detailed instructions which are included with the Powers unit, to program the controller for specific results. In my asphalt tank monitor, I program the unit to convert the signal from the pressure transducer into weight quantity units, e.g., tons, and to display the quantity in the digital readout panel 17. I further program the unit to energize a horn 19 or other alarm in the event that the oil quantity shall fall outside selected high and low limits related to the quantity approaching an overload or one approaching empty. The details of programming the Powers controller unit are beyond the scope of this description but are within the capacity of the technician who installs my asphalt tank monitor as well as the lead operator.

An alarm is illustrated in the drawings as a horn 19, but the alarm signal is equally applicable to a flashing light, or both a flashing light and a horn. In my preferred embodiment, I employ a biscuit-size horn, the Mallory SONALERT® alarm, Model 110J, which is now available from Emhart Industries of Indianapolis, Ind.

Air escapes from the probe as a continuous stream of bubbles, and as each bubble develops and breaks free, there is small disturbance in the pressure which shows up as a rapid variation in the least significant figure of the digital readout. To quiet the digital readout from the irritating variations, a small damper tank 20 (FIG. 1) is appended to the pressure tube. The small pressure changes associated with the escape of air from the probe are buffered out when imposed upon the larger air volume, and a stable, short-time-average value is reported by the digital readout. To serve this purpose, I use a portable air tank made by Midwest Products of Strafford, Mo., the 5-gallon model, Pmax 125 PSI.

The instrument package 13 contains the controller 16, the pressure transducer 15, the air pump 14, and the alarm horn 19. I use the Vynckier case made in Belgium, type VJ and RVJ, which is sold by GEC Canada Ltd., Mississauga, Ontario.

Once installed, the asphalt tank monitor must be calibrated to provide a rational digital readout. The best way to calibrate is simply to fill the empty tank from a metering tank truck while cross relating the meter reading with the digital readout. Once that basic information is tabulated, the digital readout may be specially programmed to show the engineering units of choice, e.g. tons. Alternatively, the calibration may be accomplished from knowledge of the geometry of the tank together with selected measurements made by "tanksticking."

"Tanksticking" (see FIG. 1) requires dispatching an operator, represented by the stick figure 26 to the top of the asphalt oil tank, which is accessed at a height of sixteen feet by means of a ladder. The operator opens the heavy manhole cover 23 and peers into the dark space below using the illumination of a flashlight to probe with a calibrated stick 24 to measure the distance from a mark on the manhole 22 to the surface of the asphalt oil 27 contained in the tank. This onerous task entails exposing the operator to noxious vapors that arise from the manhole from the asphalt oil which is held at a temperature of 325° F. by a circulating oil heater (not illustrated).

Recourse to the disagreeable task of "tanksticking" is minimized through the use of my asphalt oil tank monitor.

It is obvious that while my tank gauge invention has its origin in the asphalt oil problem, my tank gauge is applicable to monitoring tanks containing other kinds of oils and liquids.

What is claimed is:

1. An apparatus to monitor the quantity of liquid contained in a tank, comprising:
   a pipe probe inserted downward into the tank, reaching near the bottom of the tank;

an air pump connected pneumatically to the probe, to pressurize the probe and to displace the liquid from the probe until air bubbles escape from the bottom end of the probe, whereupon the air pressure within the probe is proportional to the height of the liquid in the tank;

a piezoresistive pressure transducer for measuring the probe air pressure;

a pneumatic connection between the probe and the pressure transducer;

an electronic process controller, connected electrically to and working in concert with the pressure transducer, to produce a voltage whose value is proportional to the probe air pressure;

a numeric digital readout, to report the voltage, or to report the quantity of liquid directly in selected engineering units as programmed into the controller applying conversion factors and tank volumetrics to said voltage; and, air tank means, appended pneumatically to the connection between the probe and the pressure transducer, for buffering the air pressure against insignificant variations associated with the evolution of individual air bubbles at the end of the probe, and for eliminating jittery variations in the least significant figure of the readout.

2. In an apparatus to monitor the quantity of liquid contained in a tank, of the type which includes: a pipe probe inserted downward into the tank and reaching near the bottom of the tank; an air pump connected pneumatically to the probe, to displace the liquid from the probe until air bubbles escape from the bottom end of the probe, whereupon the air pressure within the probe is proportional to the height of the liquid in the tank; a piezoresistive pressure transducer for measuring the probe air pressure; a pneumatic connection between the probe and the transducer; an electronic process controller, connected electrically to and working in concert with the transducer to produce a voltage whose value is proportional to the probe air pressure; and a numeric digital readout to report that voltage directly in volts, or to report the voltage in terms of selected engineering units as programmed into the controller according to the controller manufacturer's instructions using appropriate conversion factors and tank volumetrics; the improvement comprising:

air tank means, appended pneumatically to the connection between the probe and the pressure transducer, for buffering the probe air pressure against insignificant small variations associated with the evolution of individual air bubbles at the end of the probe, resulting in the readout being free from jittery variations in the least significant figure.

3. In an apparatus to monitor the quantity of liquid contained in a tank, which apparatus is of the type which employs an air-pressurized pipe probe inserted downward into the tank, and wherein the pressure in the probe is proportional to the depth of liquid in the tank at which bubbles are evolved from the end of the probe, and in which that pressure is referred by a pneumatic system to pressure transducer means operating in concert with electronic controller means to give a voltage proportional to the pressure, and wherein that voltage may be displayed as volts or in engineering units as a numeric digital readout, the improvement comprising:

air tank means, appended to the pneumatic system between the pressure transducer means and the probe, wherein the air tank means, by increasing the volume of said pneumatic system, serves the purpose of buffering the probe air pressure against insignificant small variations associated with the evolution of individual air bubbles at the end of the probe, resulting in the readout being free from insignificant jittery variations in the least significant figure.

* * * * *